(12) United States Patent
Kitagata et al.

(10) Patent No.: US 7,821,571 B2
(45) Date of Patent: Oct. 26, 2010

(54) SOLID-STATE IMAGING DEVICE, METHOD OF DRIVING SOLID-STATE IMAGING DEVICE, AND IMAGING APPARATUS

(75) Inventors: Kazushi Kitagata, Kanagawa (JP); Soichiro Kuramochi, Kanagawa (JP); Ken Koseki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1059 days.

(21) Appl. No.: 11/537,759

(22) Filed: Oct. 2, 2006

(65) Prior Publication Data

US 2007/0085921 A1    Apr. 19, 2007

(30) Foreign Application Priority Data

Oct. 4, 2005    (JP)    ............................ P2005-290784

(51) Int. Cl.
*H04N 5/238*    (2006.01)
(52) U.S. Cl. ..................................... 348/367; 348/221.1
(58) Field of Classification Search ........................ None
See application file for complete search history.

(56) References Cited

U.S. PATENT DOCUMENTS 6,809,766 B1 * 10/2004 Krymski et al. ............. 348/296

2005/0057673 A1 * 3/2005 Shimomura et al. ......... 348/294
2007/0098386 A1 * 5/2007 Yoneda et al. ................ 396/60

FOREIGN PATENT DOCUMENTS

WO    WO 02063869 A1 *    8/2002

* cited by examiner

*Primary Examiner*—Jason Whipkey
*Assistant Examiner*—Dennis Hogue
(74) *Attorney, Agent, or Firm*—Sonnenschein Nath & Rosenthal LLP

(57) ABSTRACT

A solid-state imaging device includes: a pixel array section having a plurality of unit pixels, each including a photoelectric conversion element, arranged therein; driving means for performing a shutter operation for removing charge stored in the photoelectric conversion element and a read operation for reading the charge of an electric signal that is obtained by the photoelectric conversion of the photoelectric conversion element and is then stored in the photoelectric conversion element; and control means, when a unit pixel driving mode is changed from a first driving mode to a second driving mode in the units of frames, for changing the shutter operation to the second driving mode while keeping the read operation in the first driving mode for a period corresponding to one frame in the current frame, and changing the read operation to the second driving mode in the next frame.

7 Claims, 16 Drawing Sheets

FIG. 9
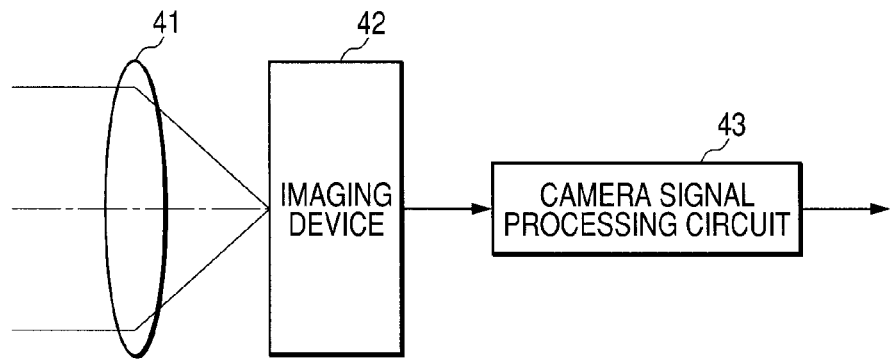
Prior Art    FIG. 10
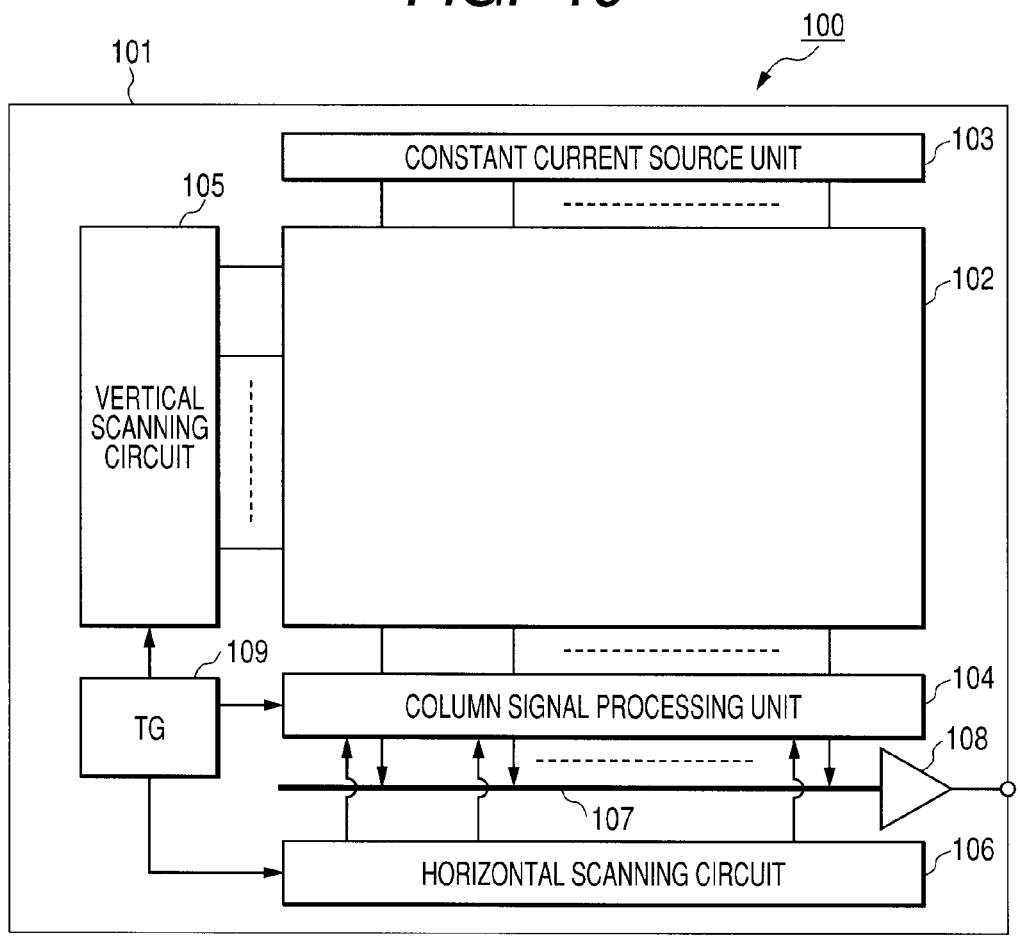

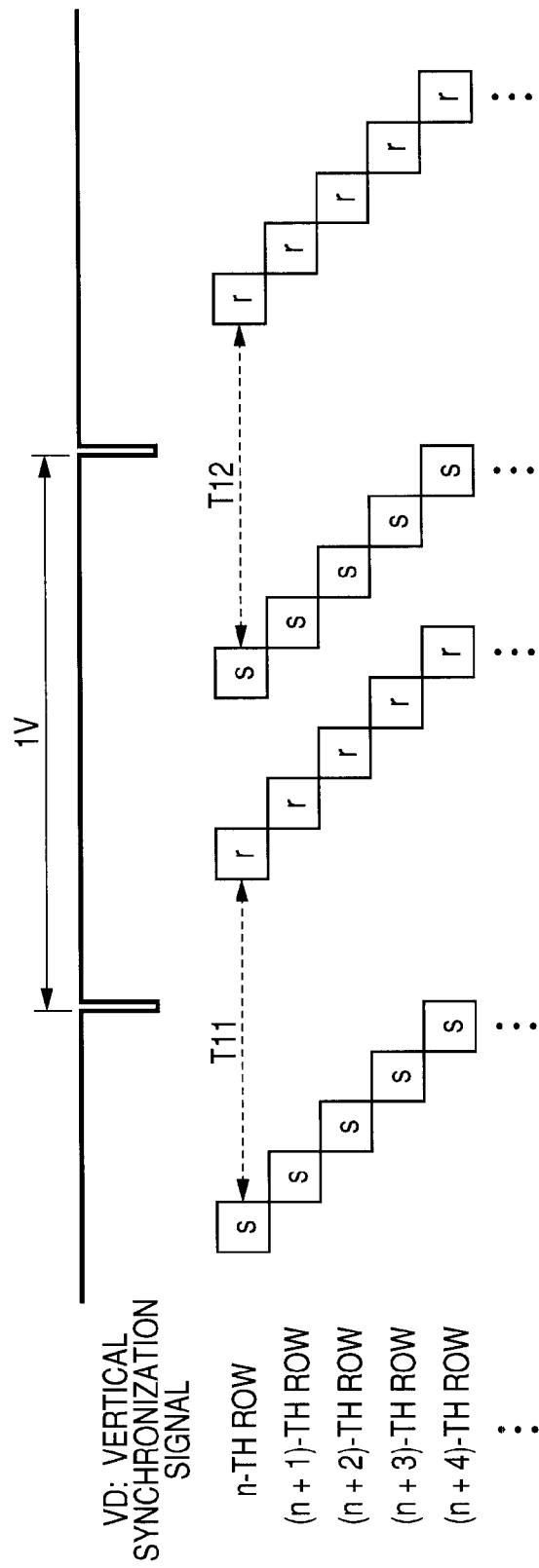

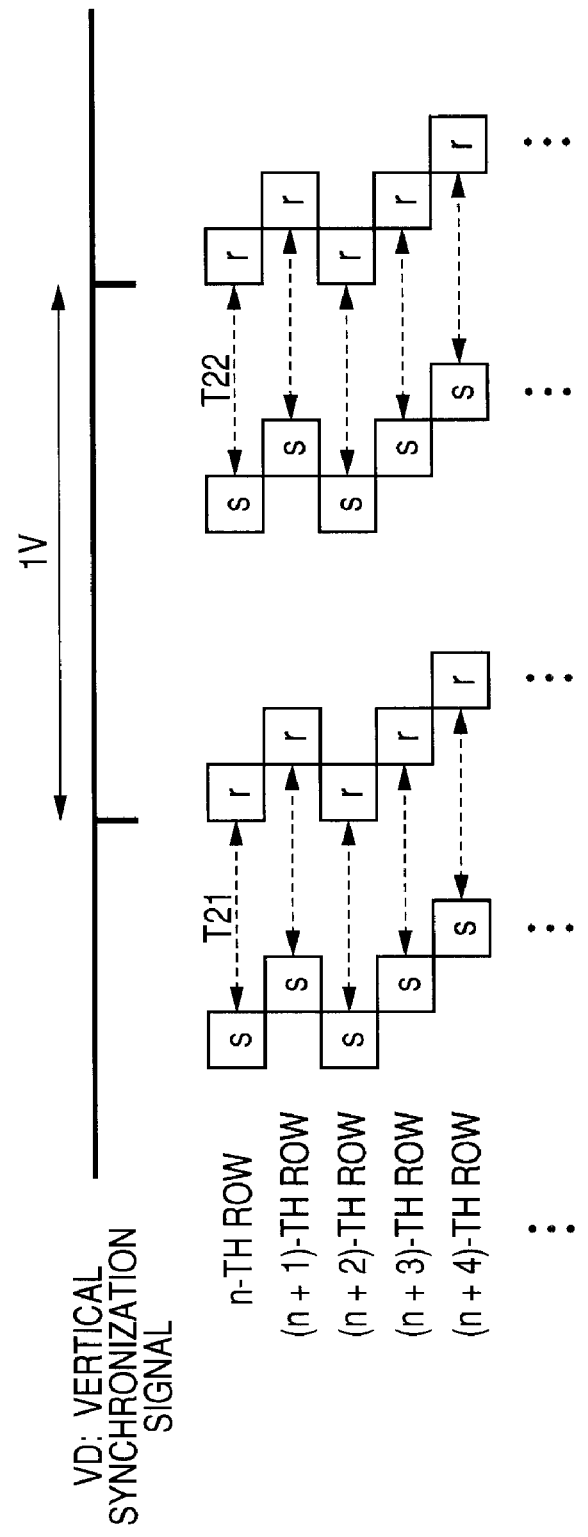

SOLID-STATE IMAGING DEVICE, METHOD OF DRIVING SOLID-STATE IMAGING DEVICE, AND IMAGING APPARATUS

CROSS REFERENCES TO RELATED APPLICATIONS

The present invention contains subject matter related to Japanese Patent Application JP 2005-290784 filed in the Japanese Patent Office on Oct. 4, 2005, the entire contents of which being incorporated herein by reference.

BACKGROUND OF THE INVENTION

1. Field of the Invention

The present invention relates to a solid-state imaging device, a method of driving a solid-state imaging device, and an imaging apparatus.

2. Description of the Related Art

Solid-state imaging devices are divided into two main types, that is, a charge-transfer-type solid-state imaging device, such as a CCD (charge coupled device) image sensor, and a MOS solid-state imaging device, such as a CMOS (complementary metal oxide semiconductor) image sensor. In recent years, the MOS solid-state imaging device, for example, the CMOS image sensor has been used for a camera module having low power consumption that is provided in a mobile apparatus, such as a cellular phone, or a high-sensitivity electronic still camera.

For example, in the electronic still camera required for high resolution, since a still picture obtained by pressing the shutter of the camera needs to have high resolution, a solid-state imaging device having a larger number of pixels has been used. However, in the electronic still camera, a user can see a subject through an electronic view finder or a small monitor. Therefore, it is necessary to read image signals having relatively low resolution at high speed in a stage in which the subject is viewed.

In the CMOS image sensor of the related art having color filters for R (red), G (green), and B (blue) color cording, in order to read the image signals having relatively low resolution at high speed, pixel information on n pixels in the horizontal direction (n is an integer that is equal to or larger than 2) and n pixels in the vertical direction is added, and is then read as pixel information on one pixel (for example, JP-A-2004-266369). Hereinafter, a driving mode in which the pixel information on the n pixels in the horizontal direction and the n pixels in the vertical direction is added and is then read as the pixel information on one pixel is referred to as a horizontal/vertical n/n read mode.

FIG. 10 is a block diagram illustrating the basic structure of a CMOS image sensor according to the related art. As shown in FIG. 10, a CMOS image sensor 100 has a pixel array section 102, a constant current source unit 103, a column signal processing unit (column processing unit) 104, a vertical scanning circuit 105, and a horizontal scanning circuit 106, horizontal signal lines 107, an output processing unit 108, and a timing generator 109 that are provided on a semiconductor substrate 101.

The pixel array unit 102 includes a plurality of pixels (not shown) arranged in a two-dimensional matrix, and each of the plurality of pixels has a photoelectric conversion element. A vertical signal line (not shown) is arranged for each row of pixels.

The CMOS image sensor 100 having the above-mentioned structure performs a shutter operation for removing charge stored in the photoelectric conversion element and a read operation for read the charge of an electric signal that is obtained by the photoelectric conversion of the photoelectric conversion element and is stored in the photoelectric conversion element. The two operations will be described below.

FIG. 11 is a timing chart illustrating a driving mode for read all pixels. FIG. 11 shows the read operation and the shutter operation for an n-th row of pixels and subsequent rows of pixels represented in the unit of one frame. Here, a pixel subjected to the shutter operation is represented by a character 's', and a pixel subjected to the read operation is represented by a character 'r'.

In FIG. 11, T11 and T12 correspond to storage times in the n-th row of pixels. FIG. 11 shows the driving mode for reading all the pixels that is continuously performed. In this case, the storage times T11 in all rows of pixels have the same interval, and the storage times T12 in all rows of pixels have the same interval. When the setting of the storage time is not changed, the storage times T11 and T12 are equal to each other.

FIG. 12 is a timing chart illustrating a horizontal/vertical 2/2 read mode. FIG. 12 shows the read operation and the shutter operation for an n-th row of pixels and subsequent rows of pixels represented in the unit of one frame. Here, similar to FIG. 11, a pixel subjected to the shutter operation is represented by a character 's', and a pixel subjected to the read operation is represented by a character 'r'. Periods from the shutter operation to the read operation are represented by storage times T21 and T22.

As shown in FIG. 12, in the horizontal/vertical 2/2 read mode, the pixels are driven as follows: an n-th row of pixels and an (n+2)-th row of pixels are simultaneously processed in the vertical direction, and then an (n+1)-th row of pixels and an (n+3)-th row of pixels are simultaneously processed.

FIG. 12 shows the horizontal/vertical 2/2 read mode that is continuously performed. In this case, the storage times T21 in all rows of pixels have the same interval, and the storage times T22 in all rows of pixels have the same interval. When the setting of the storage time is not changed, the storage times T21 and T22 are equal to each other.

Next, pixel scanning methods during the shutter operation and the read operation will be described with reference to FIGS. 13A and 13B. FIG. 13A shows a general RGB pixel arrangement (Bayer pattern) in the CMOS image sensor, and FIG. 13B shows the scanning direction.

As shown in FIG. 13A, in the Bayer pattern, odd-numbered rows of pixels indicate GR rows, and even-numbered rows of pixels indicate GB rows. When the shutter operation or the read operation is performed on the Bayer pattern, scanning is performed on the pixels in the order represented by arrow A, as shown in FIG. 13B. In FIG. 13B, HD indicates a horizontal synchronization signal.

Figures 14A, 14B, 14C:
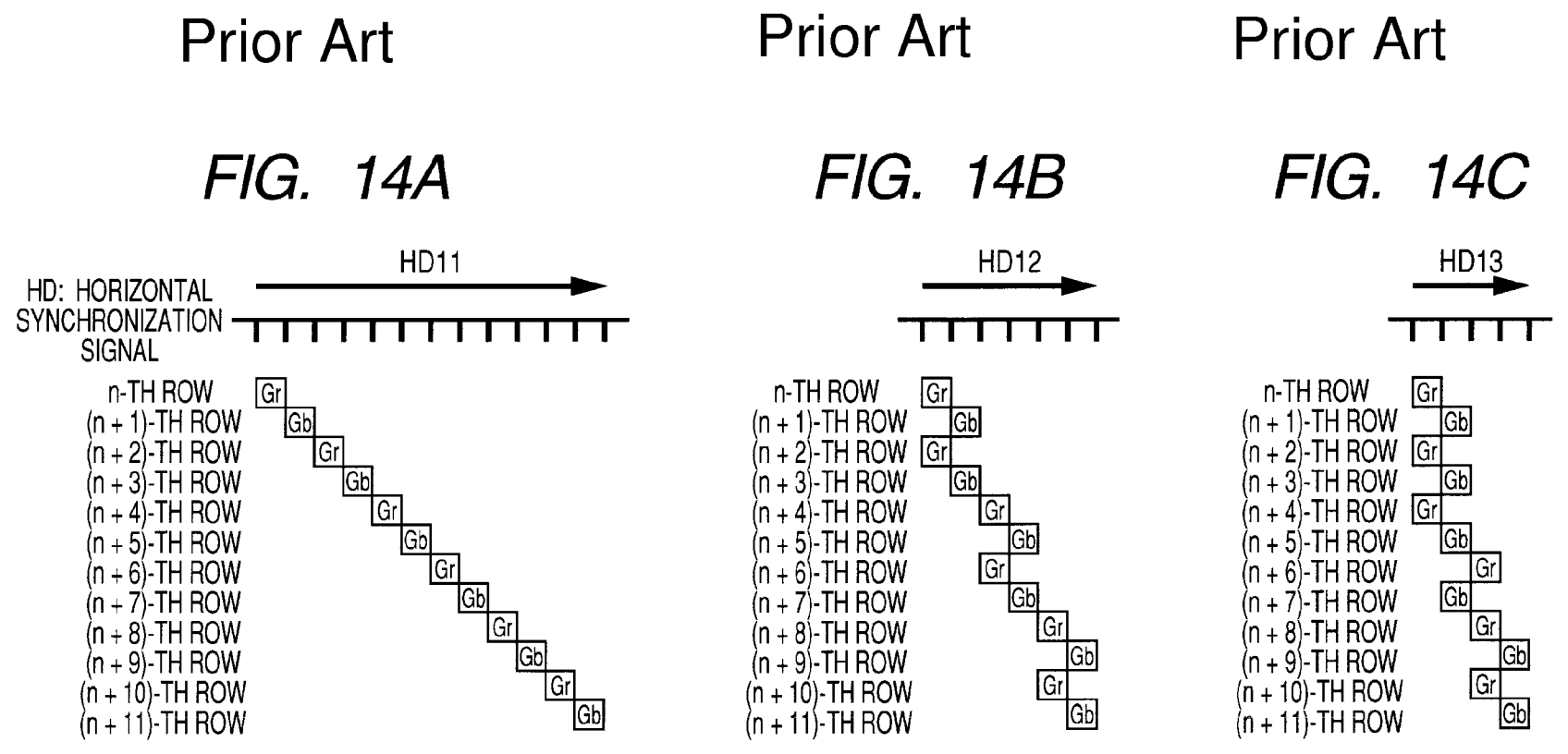

FIGS. 14A to 14C are timing charts illustrating the difference among pixel driving timings due to the difference among the pixel driving modes according to the related art.

FIG. 14A is a timing chart illustrating an all-pixel read mode, FIG. 14B is a timing chart illustrating a horizontal/vertical 2/2 read mode, and FIG. 14C is a timing chart illustrating a horizontal/vertical 3/3 read mode. In FIGS. 14A to 14C, rectangular signals Gr and Gb indicate each row of pixels to be scanned as shown in FIG. 13B. More specifically, the signal Gr indicates a place in which the GR row of pixels is scanned, and the signal Gb indicates a place in which the GB row of pixels is scanned.

As shown in FIG. 13A, the GR row indicates an odd-numbered row of pixels, and the GB row indicates an even-numbered row of pixels. Therefore, the odd-numbered row of pixel is substituted for the signal Gr, and the even-numbered row of pixels is substituted for the signal Gb. Then, scanning is performed on the signals Gr and Gb.

In the all-pixel read mode, as shown in FIG. 14A, the GR rows and the GB rows are sequentially read. However, in the horizontal/vertical 2/2 read mode, since two pixels are added in the vertical direction, two GR rows, that is, an n-th row and an (n+2)-th row are simultaneously scanned, and then two GB rows, that is, an (n+1)-th row and an (n+3)-th row are simultaneously scanned, as shown in FIG. 14B.

In the horizontal/vertical 3/3 read mode, since three pixels are added in the vertical direction, three GR rows, that is, an n-th row, an (n+2)-th row, and an (n+4)-th row are simultaneously scanned, and then three GB rows, that is, an (n+3)-th row, an (n+5)-th row, and an (n+7)-th row are simultaneously scanned, as shown in FIG. 14C.

As shown in FIGS. 14A to 14C, different pixel driving modes cause the numbers of horizontal synchronization signals HD11, HD12, and HD13 generated for the n-th to (n+11)-th rows to be different from one another, and thus the time required to process all rows of pixels depends on the pixel driving mode. As a result, as shown in FIGS. 15A to 15C, different pixel driving modes cause tilt angles θ11, θ12, and θ13 at which rows of pixels are scanned to be different from one another.

SUMMARY OF THE INVENTION

Therefore, in recent years, in the MOS solid-state imaging device, a technique for continuously displaying images, for example, moving pictures or still pictures captured by different image capturing modes has been needed. In order to continuously display the images captured by different image capturing modes, it is necessary to continuously output the images that are driven by different pixel driving modes (for example, an all-pixel read mode, a horizontal/vertical 2/2 read mode, and a horizontal/vertical 3/3 read mode).

When the images that are driven by different pixel driving modes are continuously output, one invalid frame is generated in the driving mode according to the related art, which makes it difficult to continuously display the images that are driven by different pixel driving modes. The reason will be described below.

FIG. 16 is a timing chart illustrating a pixel driving mode according to the related art when the images that are driven by different pixel driving modes are continuously output. FIG. 16 shows a shutter operation and a read operation when the horizontal/vertical 3/3 read mode is changed to the all-pixel read mode and when the all-pixel read mode is changed to the horizontal/vertical 3/3 read mode.

In FIG. 16, when the horizontal/vertical 3/3 read mode is changed to the all-pixel read mode at a timing t11, a shutter operation s11 is performed in the horizontal/vertical 3/3 read mode at the beginning. Then, when the driving mode is changed and the vertical synchronization signal is input, the shutter operation is changed to the all-pixel read mode at the timing t11.

That is, as shown in FIGS. 15A to 15C, when the driving mode is changed, the tilt angle at which rows of pixels are scanned is also changed. Therefore, during the shutter operation s11, the tilt angle in the horizontal/vertical 3/3 read mode is changed to the tilt angle in the all-pixel read mode. Meanwhile, a read operation r11 is in the all-pixel read mode, and the length of a storage time T31 from the shutter operation s11 to the read operation r11 is not constant. As a result, data of a frame F11 immediately after the horizontal/vertical 3/3 read mode is changed to the all-pixel read mode is processed as invalid data.

When the all-pixel read mode is changed to the horizontal/vertical 3/3 read mode at a timing t12, a shutter operation s12 is performed in the all-pixel read mode at the beginning. Then, when the driving mode is changed and the vertical synchronization signal is input, the shutter operation is changed to the horizontal/vertical 3/3 read mode at the timing t12.

That is, during the shutter operation s12, the tilt angle in the all-pixel read mode is changed to the tilt angle in the horizontal/vertical 3/3 read mode. Meanwhile, a read operation r12 is in the horizontal/vertical 3/3 read mode, and the length of a storage time T32 from the shutter operation s12 to the read operation r12 is not constant. As a result, data of a frame F12 immediately after the all-pixel read mode is changed to the horizontal/vertical 3/3 read mode is processed as invalid data.

In the pixel driving mode according to the related art, when the current driving mode is changed to the next new driving mode, for example, when a mode A is changed to a mode B, as shown in FIG. 17, a shutter operation sA and a read operation rB are performed in different driving modes.

That is, since storage times T from the shutter operation sA to the read operation rB for rows of pixels are not equal to each other, data of a frame F immediately after the driving mode is changed is output as invalid data. Therefore, when the images that are driven by different driving modes are continuously output, invalid data corresponding to one frame is output, which makes it difficult to continuously display the images that are captured by different image capturing modes.

Accordingly, it is desirable to provide a solid-state imaging device capable of continuously outputting images captured by different image capturing modes without outputting invalid data, a method of driving the solid-state imaging device, and an imaging apparatus including the solid-state imaging device.

According to an embodiment of the invention, a solid-state imaging device includes a plurality of unit pixels, each including a photoelectric conversion element, arranged therein and performs a shutter operation for removing charge stored in the photoelectric conversion element and a read operation for reading the charge of an electric signal that is obtained by the photoelectric conversion of the photoelectric conversion element and is then stored in the photoelectric conversion element, wherein, when a unit pixel driving mode is changed from a first driving mode to a second driving mode in the units of frames, for changing the shutter operation to the second driving mode while keeping the read operation in the first driving mode for a period corresponding to one frame in the current frame, and changing the read operation to the second driving mode in the next frame.

In the solid-state imaging device having the above-mentioned structure, when the pixel unit driving mode is changed in the units of frames to output images driven by different driving modes, only the shutter operation is changed to the second driving mode while the read operation is being kept in the first driving mode (the current driving mode) for a period corresponding to one frame in the current frame, which makes it possible to make the storage times required for all rows of pixels equal to each other in a continuous series of frames.

According to the embodiment of the invention, it is possible to make the storage times required for all rows of pixels equal to each other in a continuous series of frames. Thus, it is possible to continuously output the images driven by different unit pixel driving modes (image capturing modes) without outputting invalid data.

BRIEF DESCRIPTION OF THE DRAWINGS

FIG. 9 is a block diagram illustrating an example of the structure of an imaging apparatus according to the embodiment of the invention;

FIG. 10 is a block diagram illustrating the basic structure of a CMOS image sensor according to the related art;

FIG. 11 is a timing chart illustrating the operation of an all-pixel read mode;

FIG. 12 is a timing chart illustrating the operation of a horizontal/vertical 2/2 read mode;

FIGS. 14A to 14C are timing charts illustrating the difference among pixel driving timings due to the difference among pixel driving modes according to the related art;

DESCRIPTION OF THE PREFERRED EMBODIMENTS

Hereinafter, preferred embodiments of the invention will be described with reference to the accompanying drawings.

Figure 1:
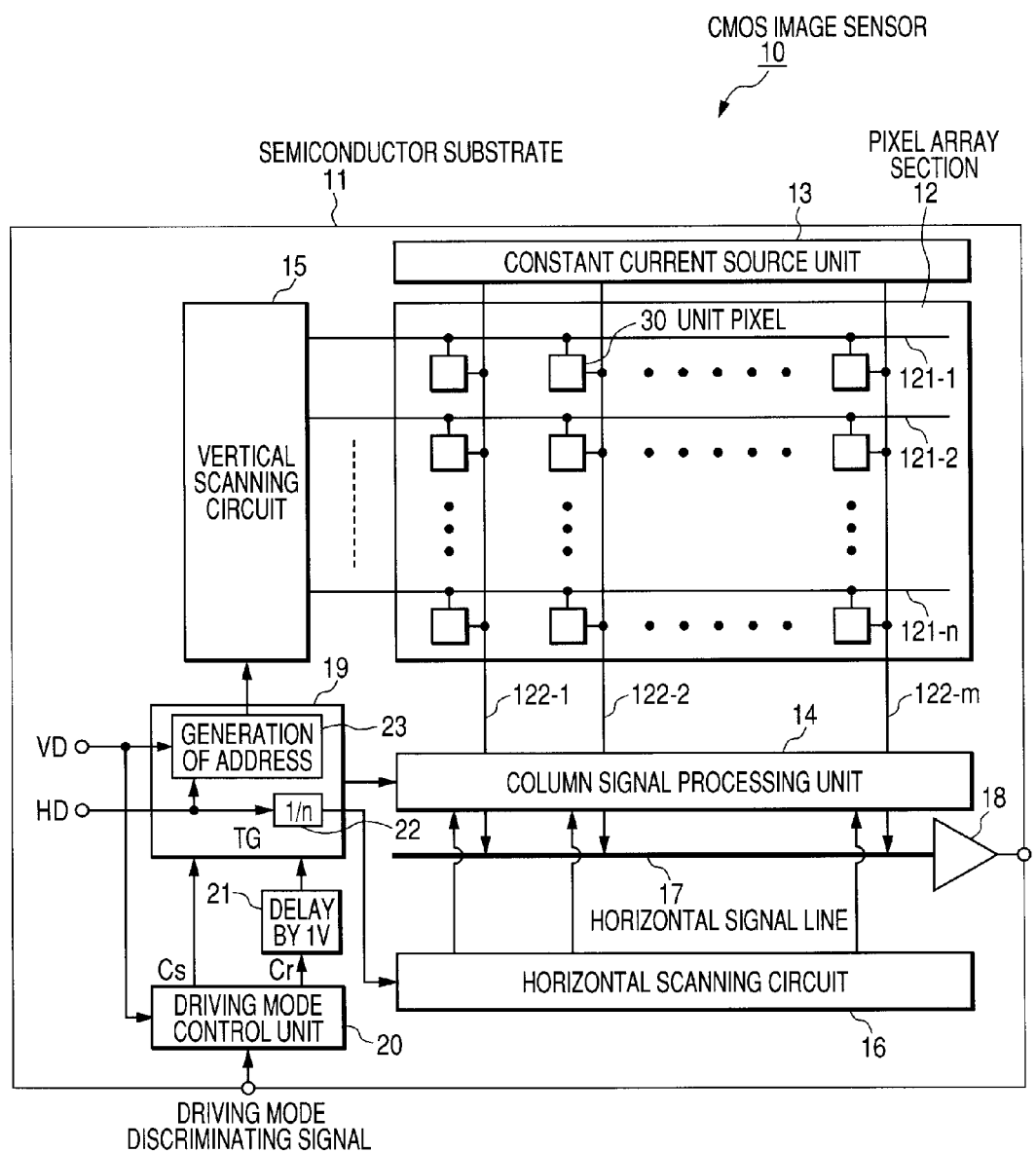
FIG. 1 is a block diagram schematically illustrating the structure of a CMOS image sensor according to an embodiment of the invention.

FIG. 1 is a block diagram schematically illustrating the structure of a solid-state imaging device according an embodiment of the invention, for example, the structure of a CMOS image sensor.

As shown in FIG. 1, a CMOS image sensor 10 according to this embodiment includes a semiconductor substrate 11 having a pixel array section 12, a constant current source unit 13, a column signal processing unit (column processing unit) 14, a vertical scanning circuit 15, a horizontal scanning circuit 16, and horizontal signal lines 17, an output processing unit 18, a timing generator (TG) 19, a driving mode control unit 20, and a 1V delay circuit 21 (V is the unit of the vertical scanning period) provided thereon.

In the pixel array section 12, a plurality of unit pixels 30 each having a photoelectric conversion element (hereinafter, simply referred to as 'pixels') are arranged in a two-dimensional matrix. In the pixel array section 12 having n rows and m columns of pixels, a row control line 121 (121-1 to 121-n) is provided for each row of pixels, and a vertical signal line 122 (122-1 to 122-m) is provided for each column of pixels.

Figure 2:
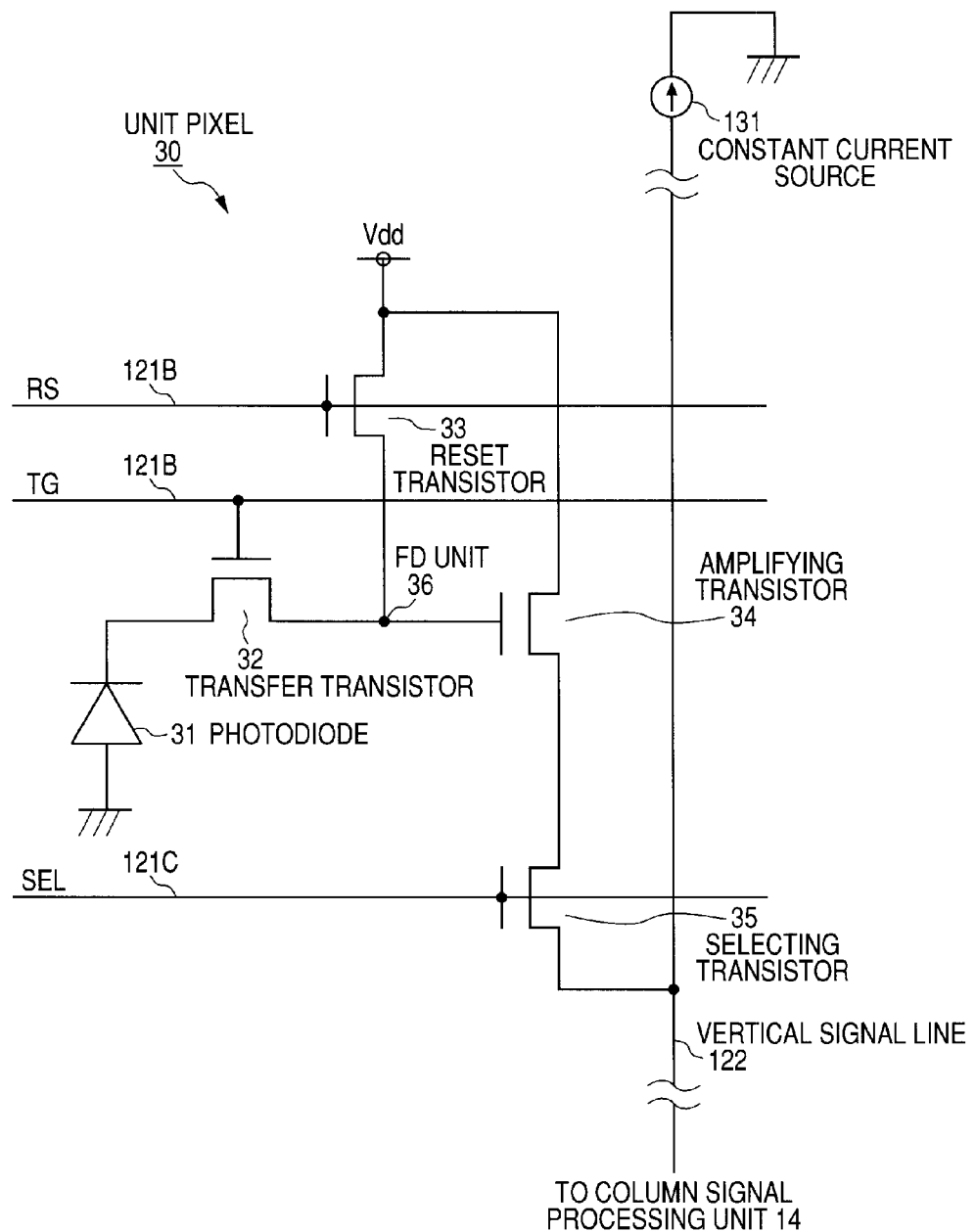
FIG. 2 is a circuit diagram illustrating an example of the circuit structure of a unit pixel.

Pixel Circuit FIG. 2 is a circuit diagram illustrating an example of the circuit structure of the unit pixel 30. As shown in FIG. 2, the unit pixel 30 according to this embodiment includes a photoelectric conversion element, for example, a photodiode 31, and four transistors, that is, a transfer transistor 32, a reset transistor 33, an amplifying transistor 34, and a selecting transistor 35. In this embodiment, for example, n-channel MOS transistors are used as these transistors 32 to 35.

In the unit pixel 30, a transfer control line 121A, a reset control line 121B, and a selection control line 121C are provided in each row of pixel as the row control line 121 (121-1 to 121-n).

The photodiode 31 converts incident light by photoelectric conversion and stores charge of the electric signal obtained by the photoelectric conversion (in this embodiment, electrons). The transfer transistor 32 is connected between a cathode electrode of the photodiode 31 and an FD (floating diffusion) unit 36, and the gate electrode of the transfer transistor 32 is connected to the transfer control line 121A through which a transfer gate pulse TG is supplied. When the transfer gate pulse TG is activated (turns to a high level), the charge of the electric signal stored in the photodiode 31 is transferred to the FD unit 36.

The reset transistor 33 has a drain electrode connected to a pixel power supply Vdd, a source electrode connected to the FD unit 36, and a gate electrode connected to the reset control line 121B through which a reset pulse RS is supplied. When the reset pulse RS is activated, the reset transistor 33 resets the potential of the FD unit 62 to the power supply potential Vdd. The amplifying transistor 34 has a gate electrode connected to the FD unit 36 and a drain electrode connected to the pixel power supply Vdd, and converts a variation in the potential of the FD unit 36 into an electric signal.

The selecting transistor 35 has a drain electrode connected to the source electrode of the amplifying transistor 34, a source electrode connected to the vertical signal line 122, and a gate electrode connected to the selection control line 113 through which a selection pulse SEL is supplied. When the selection pulse SEL is activated, the selecting transistor 35 selects each row of pixels for reading signals. When the selecting transistor 35 is turned on, the amplifying transistor 34 and a constant current source 131 of a constant current source unit 13, which will be described later, form a source follower, which causes a voltage corresponding to the potential of the FD unit 36 to be output to the vertical signal line 122 through the amplifying transistor 34 and the selecting transistor 35.

In this embodiment, the selecting transistor 35 is connected between the source electrode of the amplifying transistor 34 and the vertical signal line 122. However, the selecting transistor 35 may be connected between the drain electrode of the amplifying transistor 34 and the pixel power supply Vdd. Further, in this embodiment, the unit pixel 30 includes four transistors, but the invention is not limited thereto. For example, the unit pixel 30 may include three transistors except for the selecting transistor 35. In this case, the amplifying transistor 34 also has a function of selecting pixels.

Referring to FIG. 1, the constant current source unit 13 is provided for each column of pixels, and includes the constant current source 131 (see FIG. 2) for supplying a bias current to each unit pixel 30. The column signal processing unit 14 receives signals for each row of pixels 30 that are supplied through the vertical signal lines 122-1 to 122-m, performs predetermined signal processing, such as A/D conversion, on signals for each column of pixels, and temporarily stores the signals. The column signal processing unit 14 performs a vertical (longitudinal) addition process in a horizontal/vertical n/n read driving mode as one of the signal processing methods.

The vertical scanning circuit 15 is composed of, for example, an address decoder, and controls a shutter operation of selecting rows of pixels 30 of the pixel array section 12 row-by-row and removes the charge stored in the photodiode 31 or a read operation of reading out the charge of the electric signal that is obtained by the photoelectric conversion of the photodiode 31 and is stored in the photodiode 31. That is, the vertical scanning circuit 15 corresponds to driving means described in the appended claims.

The horizontal scanning circuit 16 is composed of, for example, a shift register. The horizontal scanning circuit 16 sequentially and selectively drives horizontal selecting switches (not shown) provided in an output unit of the column signal processing unit 14 for every column of pixels to selectively scan the signals stored in the units of columns of pixels one-by-one in the column signal processing unit 14 such that the signals are guided to the horizontal signal line 17. The output processing unit 18 performs a predetermined process on the signals for the pixels 30 that are supplied through the horizontal signal lines 17 and outputs the processed signals to the outside of the semiconductor substrate 11.

The timing generator (TG) 19 generates various timing signals and control signals required for the operations of components, such as the column signal processing unit 14, the vertical scanning circuit 15, and the horizontal scanning circuit 16, on the basis of a reference clock, such as a horizontal synchronization signal HD or a vertical synchronization signal VD supplied from the outside of the semiconductor substrate 11, and supplies the signals to the components.

The driving mode control unit 20 controls the switching of the driving mode of the unit pixel 30, such as an all-pixel read mode or a horizontal/vertical n/n read mode in synchronization with the vertical synchronization signal VD, on the basis of a driving mode discriminating signal supplied from the outside of the semiconductor substrate 11. In this case, the driving mode control unit 20 outputs a driving mode discriminating signal Cs only for the shutter operation and a driving mode discriminating signal Cr only for the read operation. In addition, the driving mode control unit 20 maintains the current driving mode until the next vertical synchronization signal VD is input.

The driving mode discriminating signal Cs only for the shutter operation output from the driving mode control unit 20 is directly supplied to the timing generator 19, and the driving mode discriminating signal Cr only for the read operation is supplied to the timing generator 19 via the 1V delay circuit 21. The 1V delay circuit 21 delays the timing of the driving mode discriminating signal Cr only for the read operation by the time corresponding to one frame (1V) in order to discriminate the driving modes of the pixels 30, that is, to discriminate the driving mode discriminating signal Cs only for the shutter operation from the driving mode discriminating signal Cr only for the read operation by only one communication attempt.

The CMOS image sensor 10 of above structure according to the embodiment of the invention is characterized as follows.

First, the 1V delay circuit 21 is provided to delay the timing of the driving mode discriminating signal Cr only for the read operation by the time corresponding to one frame (1V), that is, one vertical scanning period in order to discriminate the driving modes of the pixels 30, that is, to discriminate the driving mode discriminating signal Cs only for the shutter operation from the driving mode discriminating signal Cr only for the read operation by only one communication attempt. Therefore, when the driving mode of the pixels 30 is changed, it is possible to change only the driving mode for the shutter operation to vary the driving mode for the read operation in the next frame.

A 1/n frequency dividing circuit 22 is provided in the timing generator 19 in order to generate the horizontal synchronization signals HD having a fixed period regardless of the driving mode of the pixels 30. As described with reference to FIGS. 14A to 14C and FIGS. 15A to 15C, since the scanning periods of rows of pixels are different from each other in accordance with the driving mode of the pixels, the 1/n frequency dividing circuit 22 controls the scanning periods such that the scanning period is equal to the longest scanning period, that is, the scanning period for which all pixels are read, in all driving modes.

More specifically, when the pixel 30 is driven by a horizontal/vertical 2/2 read mode, a signal is output during two periods n=2 of the horizontal synchronization signal HD input from the outside (1/2 frequency division). In a horizontal/vertical 3/3 read mode, a signal is output during three periods n=3 of the horizontal synchronization signal HD input from the outside (1/3 frequency division). The signal obtained by dividing the frequency of the horizontal synchronization signal HD using the 1/n frequency dividing circuit 22 (hereinafter, referred to as a 'horizontal synchronization signal HDn') is supplied to the horizontal scanning circuit 16. In this way, even when different pixel driving modes are continuously performed, it is possible to set the variable range of the storage time to a maximum.

Next, the read operation and the shutter operation of the CMOS image sensor 10 according to this embodiment will be described below with reference to FIG. 3.

Figure 3:
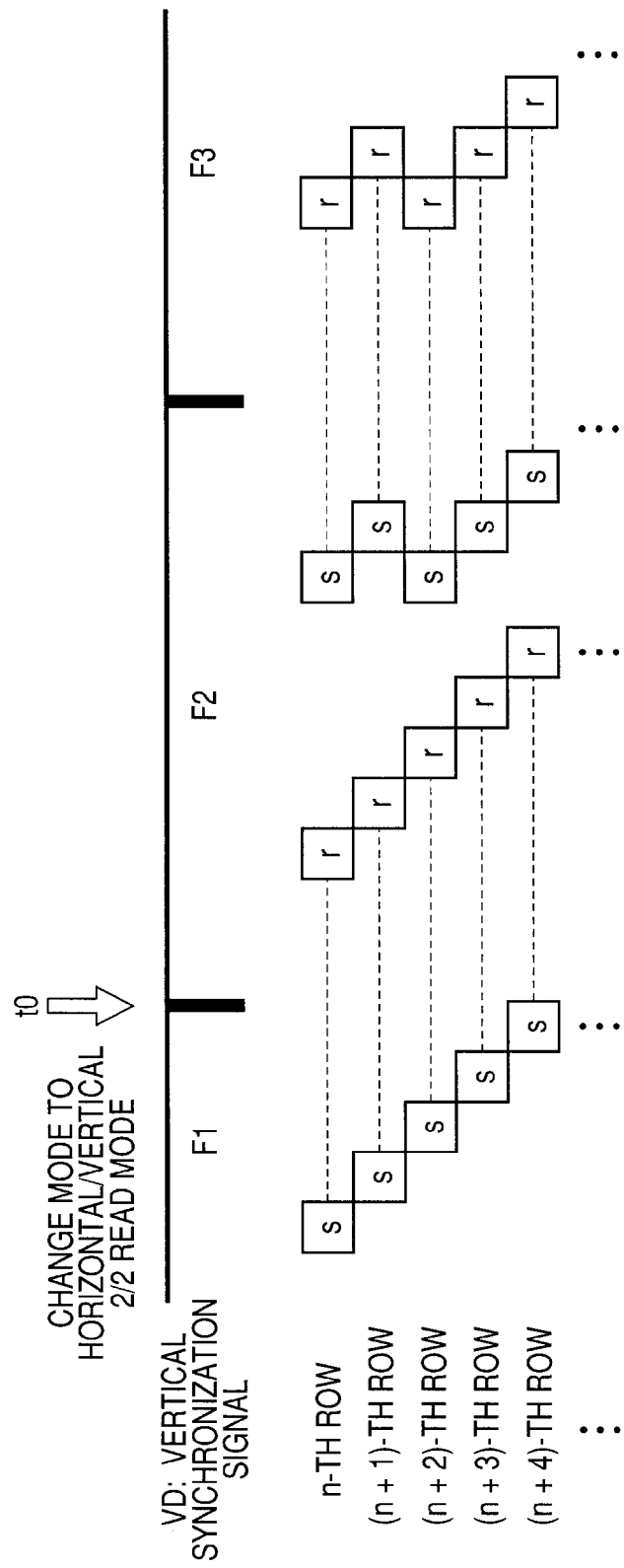
FIG. 3 is a timing chart illustrating a read operation and a shutter operation when the switching between an all-pixel read mode and a horizontal/vertical 2/2 read mode is continuously performed in the CMOS image sensor according to the embodiment of the invention.

FIG. 3 is a diagram illustrating the read operation and the shutter operation of the CMOS image sensor 10 according to this embodiment. More specifically, FIG. 3 shows a shutter driving operation and a read driving operation when an all-pixel read mode is changed to a horizontal/vertical 2/2 read mode.

In FIG. 3, when the all-pixel read mode is changed to the horizontal/vertical 2/2 read mode at a timing t0, only the shutter operation is changed to the horizontal/vertical 2/2 read mode in a frame F2 immediately after the change. Therefore, both the read operation in the frame F2 immediately after the change and the shutter operation in a frame F1 immediately before the change are in the all-pixel read mode, and the storage time of each row of pixels has the same value. As a result, image data processed by the all-pixel read mode is output in the frame F2 immediately after the change.

Meanwhile, both the shutter operation in the frame F2 immediately after the change and the read operation in the next frame F3 are in the horizontal/vertical 2/2 read mode, and the storage time of each row of pixels has the same value. Therefore, image data processed by the horizontal/vertical 2/2 read mode is output in the frame F3. In this way, when the driving mode of the pixels 30 is changed, the 1V delay circuit 21 makes it possible to change only the shutter operating driving mode to the read operation driving mode in the next frame. Therefore, it is possible to output effective image data in the frame F2 immediately after the driving mode is changed.

However, it is difficult to set the storage time to the maximum value (1V storage) in the frame F2 immediately after the driving mode is changed by providing only the 1V delay circuit 21, which causes images captured by different image pickup modes to be continuously displayed in a certain limited range. The reason will be described with reference to FIG. 4.

Figure 4:
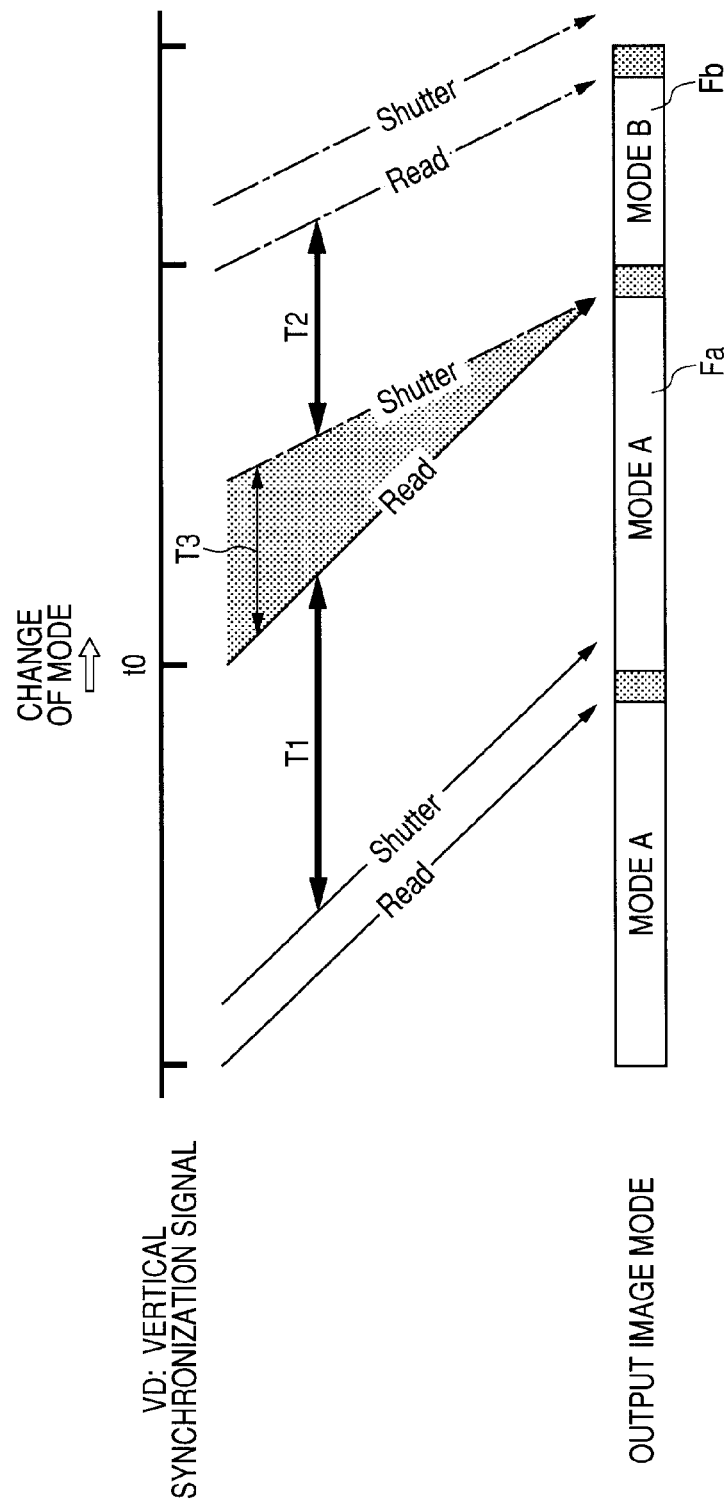
FIG. 4 is a timing chart illustrating a general timing relationship when a driving mode A is changed to a driving mode B.

FIG. 4 is a timing chart illustrating a general timing relationship when a driving mode is changed from a mode A to a mode B. In FIG. 4, the frame rate (a row scanning speed (fps)) of the mode B is higher (faster) than the frame rate of the mode A. In addition, the driving mode A corresponds to a first driving mode, and the driving mode B corresponds to a second driving mode in the appended claims.

In FIG. 4, when the driving mode is changed at the timing t0, the set range of a storage time T2 is limited. In frame Fa, a storage time T1 is the storage time of the mode A, and the range thereof can be set to a maximum value.

Meanwhile, in a frame Fb, the storage time T2 is the storage time of the mode B. However, when the storage time T2 is set to the maximum value, the scanning speed of the read operation is delayed in the frame Fa. Therefore, when the storage time T2 of each row of pixel is kept constant, it is difficult to set the storage time in only the period of time T3. Therefore, it is difficult to set the storage time T2 to the maximum value (1V storage) in the frame Fb and thus to output images.

In the CMOS image sensor 10 according to this embodiment of the invention, the 1/n frequency dividing circuit 22 is provided to set the storage time to the maximum value in any driving mode. The horizontal synchronization signal HDn obtained by dividing the frequency of the horizontal synchronization signal HD by n using the 1/n frequency dividing circuit 22 is supplied to the horizontal scanning circuit 16.

Figure 5:
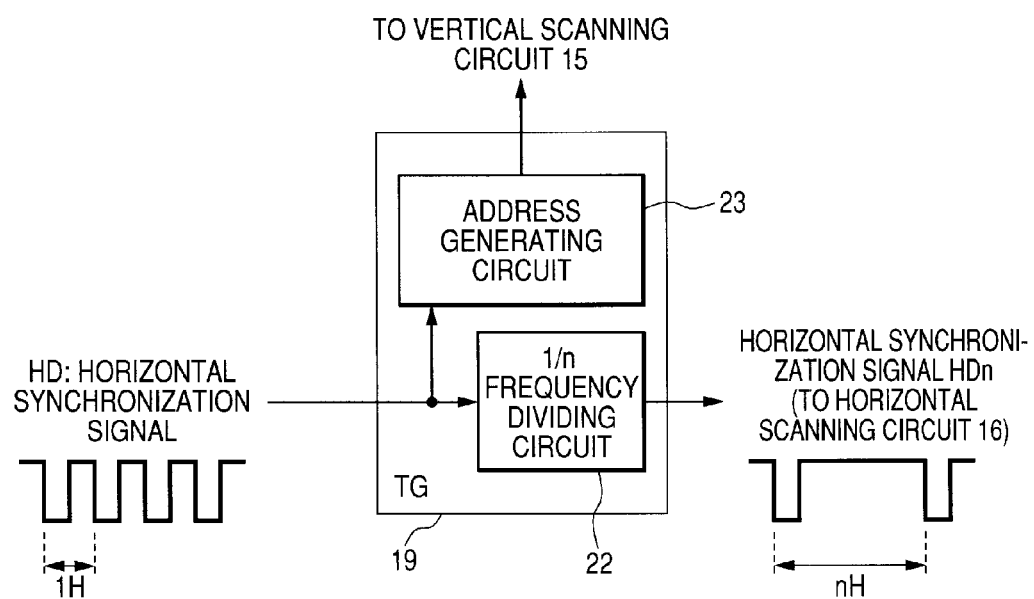
FIG. 5 is a block diagram illustrating main components of the internal structure of a timing generator including a 1/n frequency dividing circuit.

Next, the structure and operation of the timing generator 19 including the 1/n frequency dividing circuit 22 will be described below. FIG. 5 is a block diagram illustrating main components of the internal structure of the timing generator 19 including the 1/n frequency dividing circuit 22.

The timing generator 19 includes an address generating circuit 23 for generating address information to be supplied to the vertical scanning circuit 15 composed of, for example, an address decoder, in addition to the 1/n frequency dividing circuit 22. As described above, the timing generator 19 generates signals required for the operation of the vertical scanning circuit 15 and the horizontal scanning circuit 16 on the basis of a reference clock, such as the horizontal synchronization signal HD or the vertical synchronization signal VD supplied from the outside of the semiconductor substrate 11.

A synchronization signal having a period of 1H (H is a horizontal scanning period) as a period corresponding to the all-pixel read mode is input to the timing generator 19 as a horizontal synchronization signal HD. In the horizontal/vertical n/n read mode, the frequency of the horizontal synchronization signal HD is divided by a predetermined frequency division ratio (1/n), by the 1/n frequency dividing circuit 22, and the divided horizontal synchronization signal is supplied to the horizontal scanning circuit 16 as the horizontal synchronization signal HDn.

More specifically, as described above, for example, when the driving mode of the pixels 30 is the horizontal/vertical 2/2 read mode, the horizontal synchronization signal HDn input from the outside is output once in the two periods of the horizontal synchronization signal HD (1/2 frequency division). In the horizontal/vertical 3/3 read mode, the frequency of the horizontal synchronization signal HDn input from the outside is output once in the three periods of the horizontal synchronization signal HD (1/3 frequency division).

As shown in FIG. 1, the 1/n frequency dividing circuit 22 performs predetermined frequency division on the basis of the driving mode discriminating signal Cr only for the read operation that is supplied from the driving mode control unit 20 through the 1V delay circuit 21. That is, in the horizontal/vertical n/n read mode, the 1/n frequency dividing circuit 22 outputs the horizontal synchronization signal HDn once in n periods of the horizontal synchronization signal HD (that is, nH period), and supplies the horizontal synchronization signal HDn to the horizontal scanning circuit 16.

Figure 6:
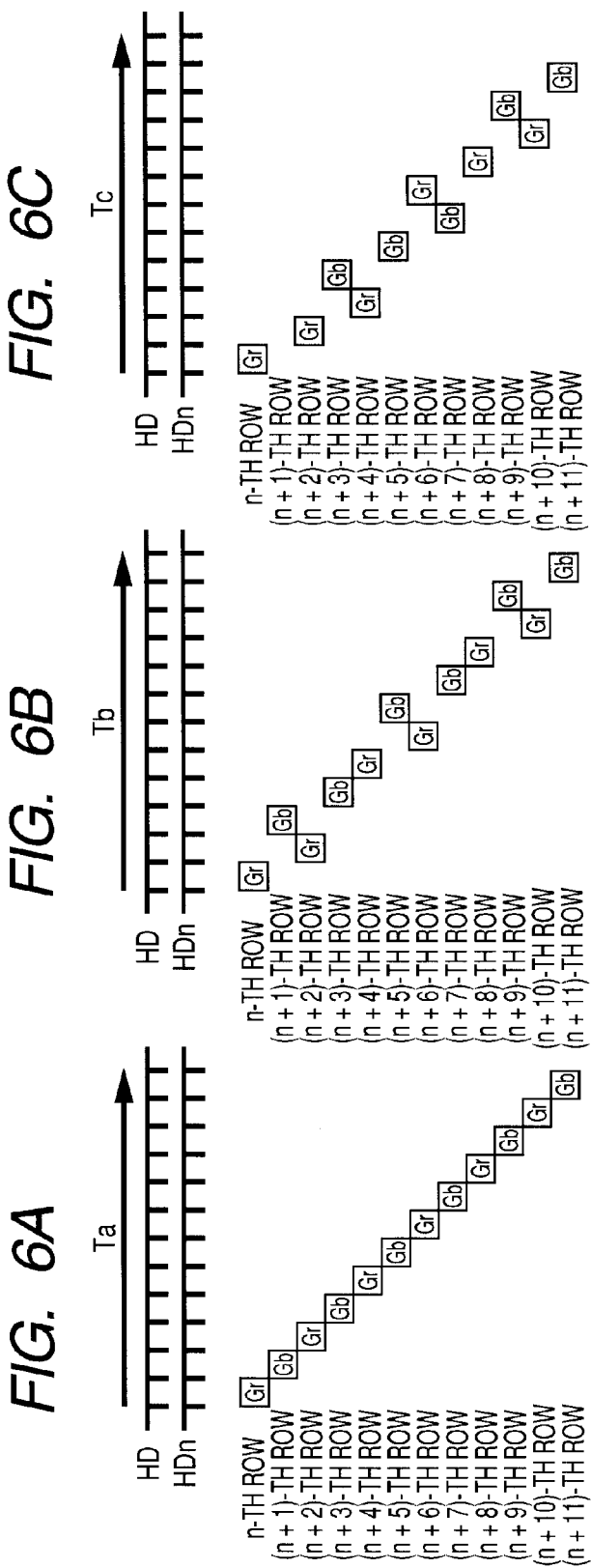
FIGS. 6A to 6C are timing charts illustrating pixel scanning directions in the all-pixel read mode, the horizontal/vertical 2/2 read mode, and a horizontal/vertical 3/3 read mode, respectively.
Figure 13B:
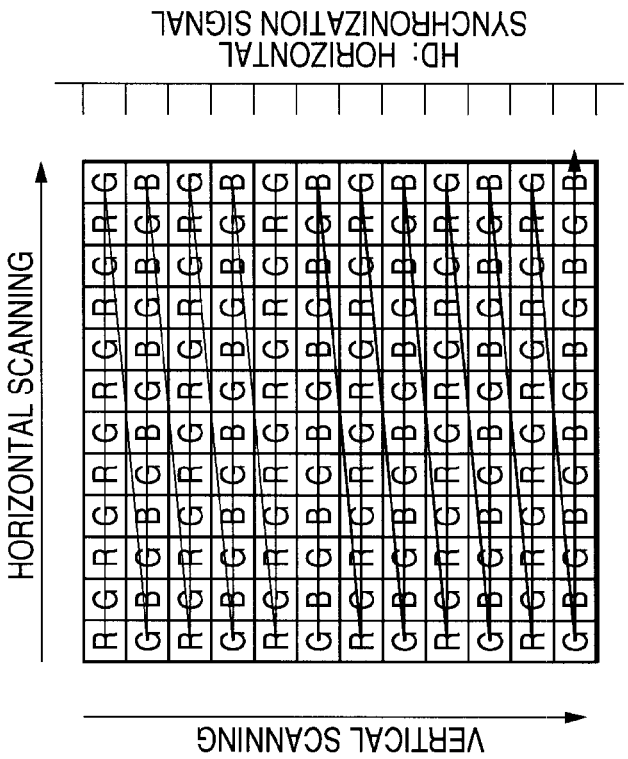
FIGS. 13A and 13B are diagrams illustrating pixel scanning directions during a shutter operation and a read operation, respectively.
Figure 13A:
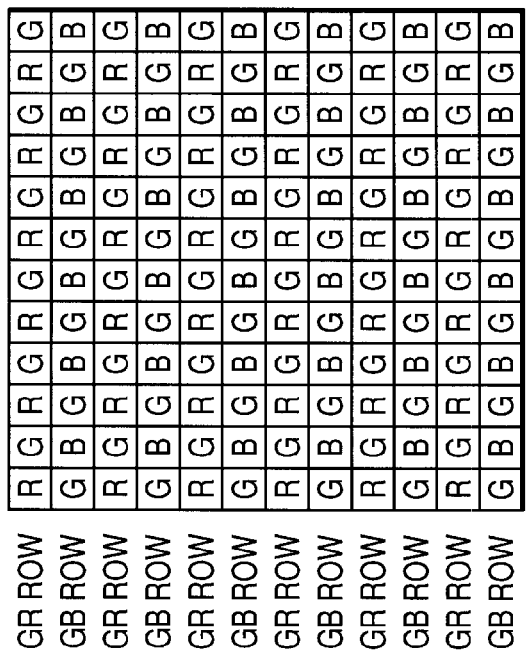
Figure 15A:
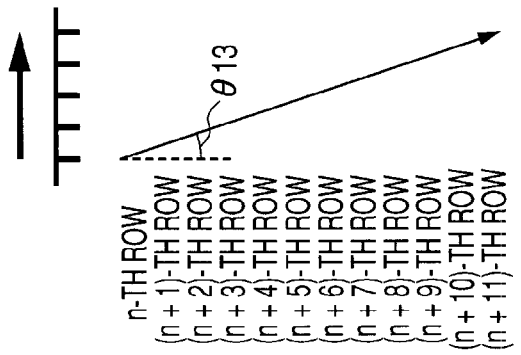
FIGS. 15A to 15C are diagrams illustrating the difference among the gradients of pixel scanning directions due to the difference among the pixel driving modes.
Figure 15B:
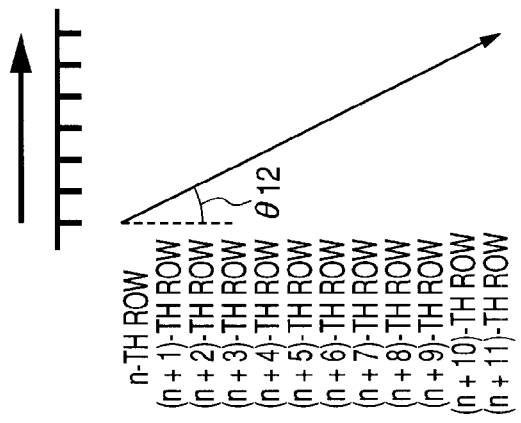
Figure 15C:
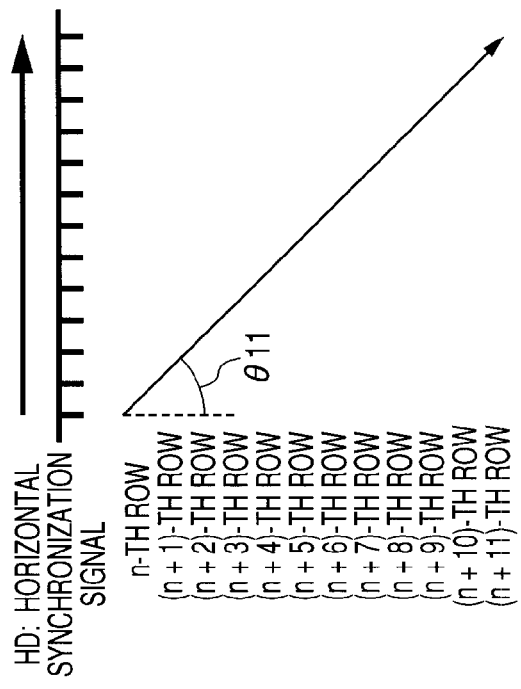
Figure 16:
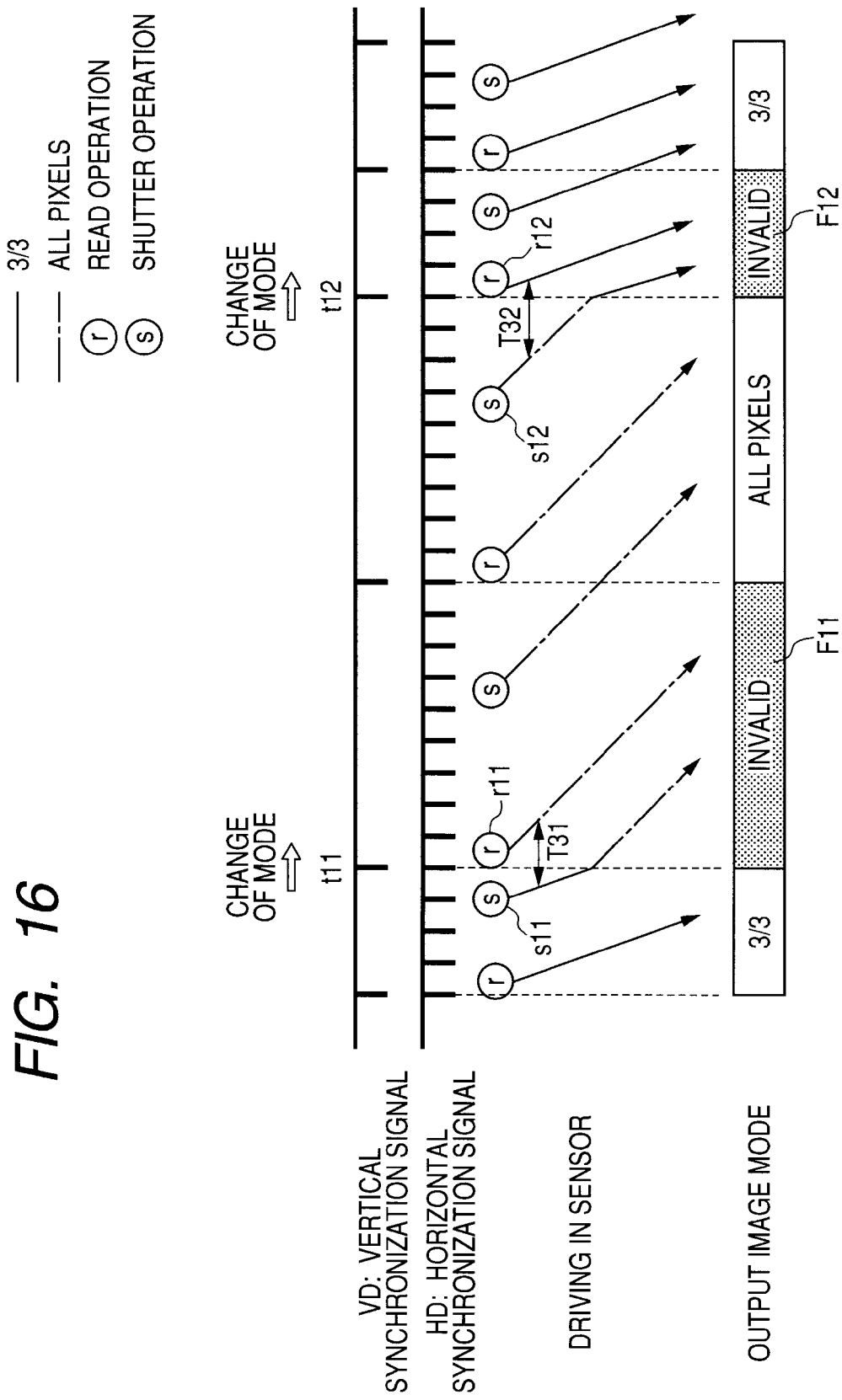
FIG. 16 is a timing chart illustrating a driving mode according to the related art when images captured by different driving modes are continuously output.
Figure 17:
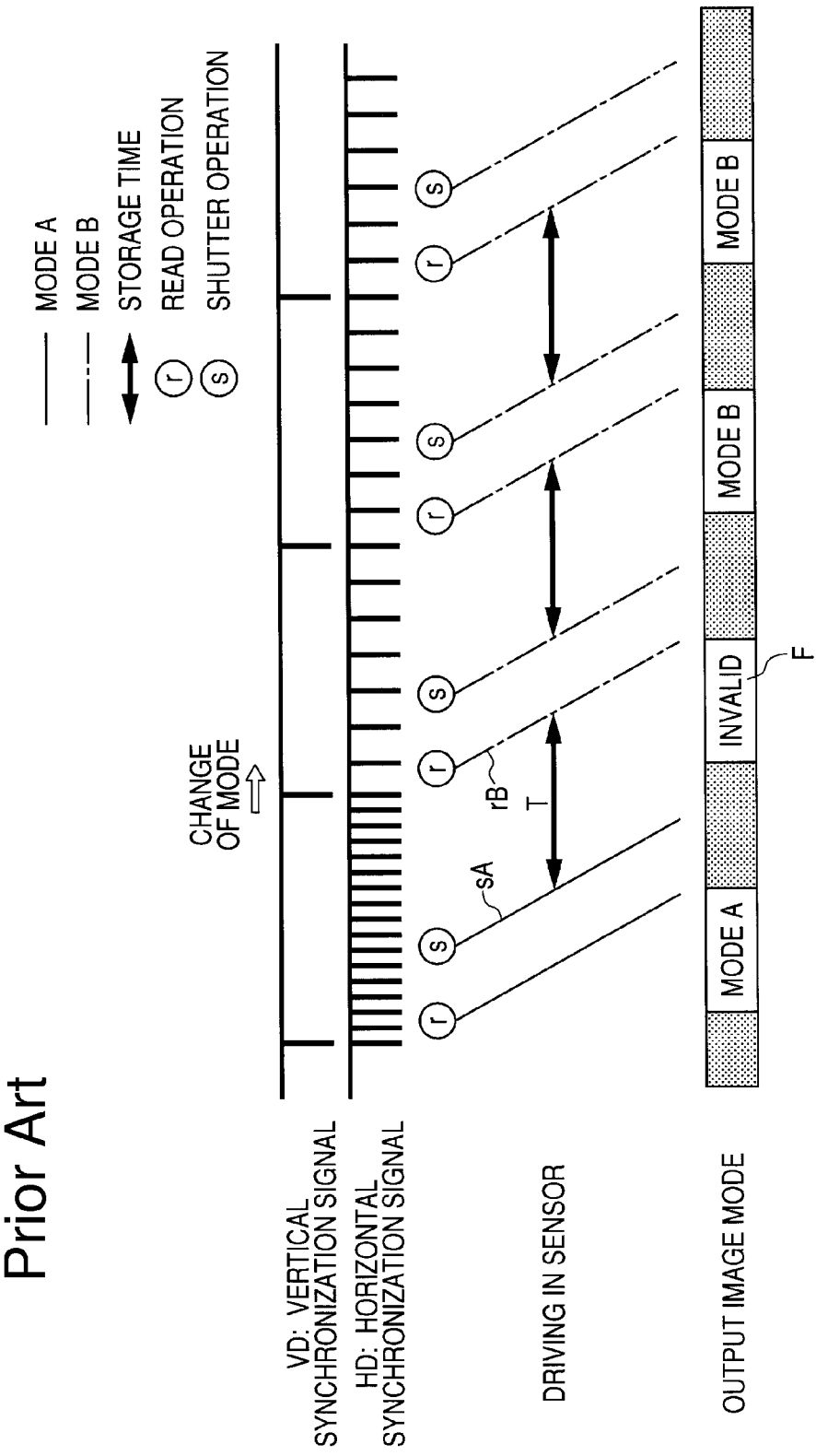
FIG. 17 is a timing chart illustrating operations in the case that a driving mode A is changed to a driving mode B.

Next, a pixel scanning method in each driving mode in the CMOS image sensor 10 according to this embodiment will be described below with reference to FIGS. 6A to 6C. In this embodiment, the Bayer pattern shown in FIG. 13B is used as an example. FIGS. 6A to 6C are timing charts illustrating methods of scanning the pixels 30 in the all-pixel read mode, the horizontal/vertical 2/2 read mode, and the horizontal/vertical 3/3 read mode, respectively.

FIG. 6A shows the pixel scanning method in the all-pixel read mode, FIG. 6B shows the pixel scanning method in the horizontal/vertical 2/2 read mode, and FIG. 6C shows the pixel scanning method in the horizontal/vertical 3/3 read mode. Rectangular signals Gr and Gb indicate the scanning of pixels in FIG. 13B in a reduced manner in units of rows. The signal Gr indicates a place in which the pixels in a GR row are scanned, and the signal Gb indicates a place in which the pixels in a GB row are scanned.

In FIGS. 6A to 6C, HD indicates a horizontal synchronization signal input from the outside, and HDn is a horizontal synchronization signal whose frequency is divided by n by the 1/n frequency dividing circuit 22 (see FIG. 5). In the Bayer pattern shown in FIG. 13B, when the all-pixel read mode is used, the GR and GB rows are sequentially scanned, similar to FIG. 14A.

In the horizontal/vertical 2/2 read mode, as shown in FIG. 6B, an n-th GR row and a (n+2)-th GR row are separately scanned according to the timing of the horizontal synchronization signal HD, and a process of adding two pixels in the vertical direction is performed at the timing of the horizontal synchronization signal HDn. Similarly, an (n+1)-th GB row and an (n+3)-th GB row are separately scanned according to the timing of the horizontal synchronization signal HD, and the process of adding two pixels in the vertical direction is performed at the timing of the horizontal synchronization signal HDn.

In the horizontal/vertical 3/3 read mode, as shown in FIG. 6C, an n-th GR row, an (n+2)-th GR row, and an (n+4)-th GR row are separately scanned according to the timing of the horizontal synchronization signal HD, and a process of adding three pixels in the vertical direction is performed at the timing of the horizontal synchronization signal HDn. Similarly, an (n+3)-th GB row, an (n+5)-th GB row, and an (n+7)-th GB row are separately scanned according to the timing of the horizontal synchronization signal HD, and the process of adding three pixels in the vertical direction is performed at the timing of the horizontal synchronization signal HDn.

As can be seen from FIGS. 6A to 6C, since the same number of horizontal synchronization signals HD is generated in all driving modes required for the n-th to (n+11)-th rows regardless of the driving mode of the pixels 30, the above-mentioned scanning method makes all the scanning periods Ta, Tb, and Tc in all driving modes equal to each other, regardless of the driving mode of the pixels 30.

Figure 7:
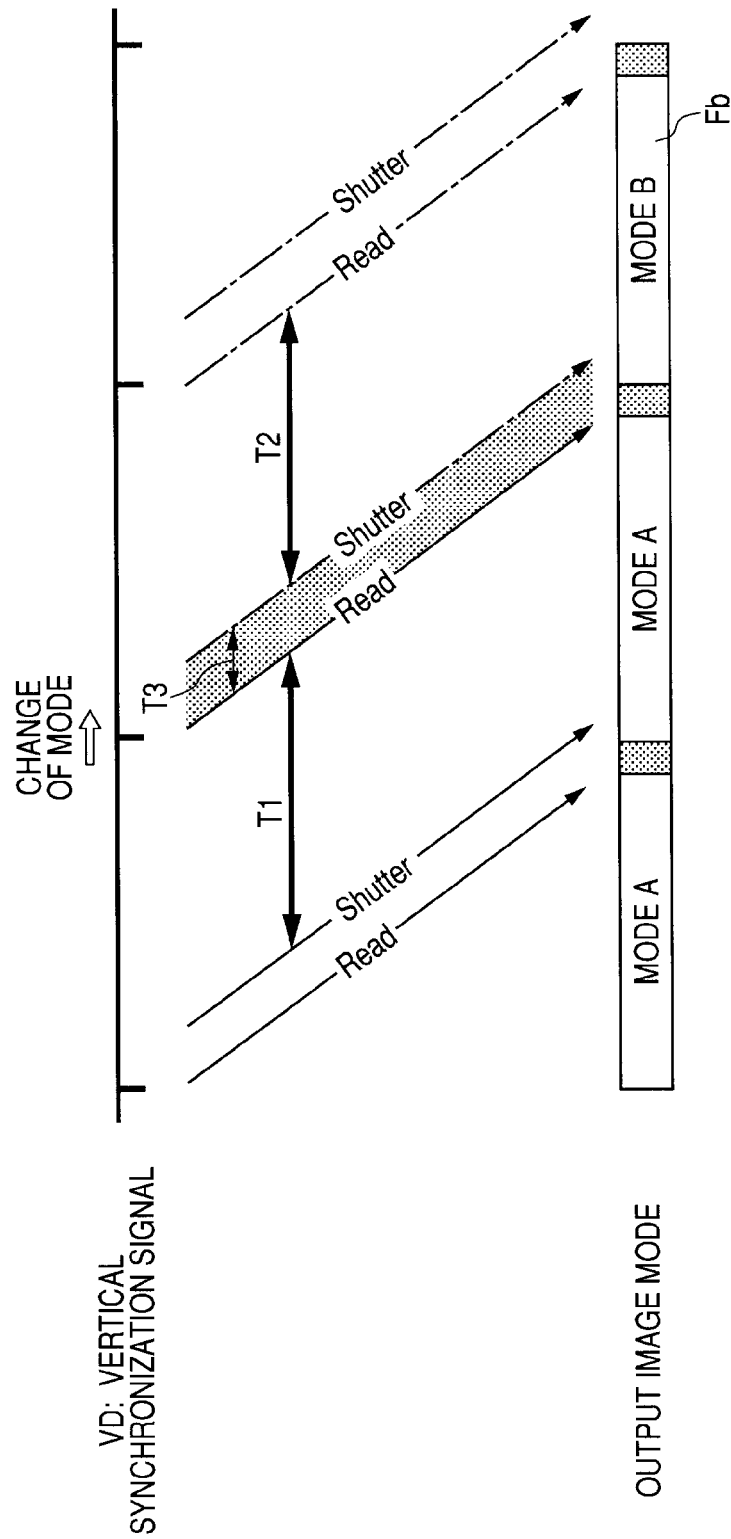
FIG. 7 is a timing chart illustrating a mode change from the driving mode A to the driving mode B in order to explain the operation of the 1/n frequency dividing circuit.

As described above, the horizontal synchronization signal HD having a period corresponding to a driving mode having the lowest frame rate (in this embodiment, the all-pixel read mode) is input to the timing generator 19, and the 1/n frequency dividing circuit 22 divides the frequency of horizontal synchronization signal HD at a frequency division ratio (1/n), which corresponds to each driving mode and supplies the horizontal synchronization signal having the divided frequency to the horizontal scanning circuit 16, which makes it possible to perform scanning at a fixed rate in all driving modes. Therefore, as shown in FIG. 7, it is possible to set the storage time T2 in the range including the period T3 for which it is difficult to set the storage time, which is described with reference to FIG. 4, in the frame Fb in which the driving mode is changed. Thus, it is possible to output an image with the storage time set to a maximum value (1V storage).

As can be seen from the above, the timing generator 19 and the 1V delay circuit 21 correspond to control means in the appended claims. When the driving mode of the pixel 30 is changed from the first driving mode (driving mode A) to the second driving mode (driving mode B) in the units of frames, the read operation driving mode is held to the first driving mode for a period corresponding to one frame (one vertical scanning period), and the shutter operation driving mode is changed to the second driving mode in the current frame. Then, in the next frame, the read operating driving mode is changed to the second driving mode.

The operation of this embodiment is described with reference to FIG. 8. When the driving mode A is changed to the driving mode B, the driving modes of a shutter operation s1 and a read operation r1 are the same, and the storage times T of all rows of pixels are equal to each other. Therefore, a frame Fa is output as data of the mode A. Thus, it is possible to continuously output image data without outputting invalid data as image data processed by different driving modes, and thus to set the variable range of the storage time T to a maximum value.

In the CMOS image sensor 10 according to this embodiment, the switching of driving modes is performed at the timing when the vertical synchronization signal VD is input, and the current driving mode is maintained until the next vertical synchronization signal VD is input.

Figure 8:
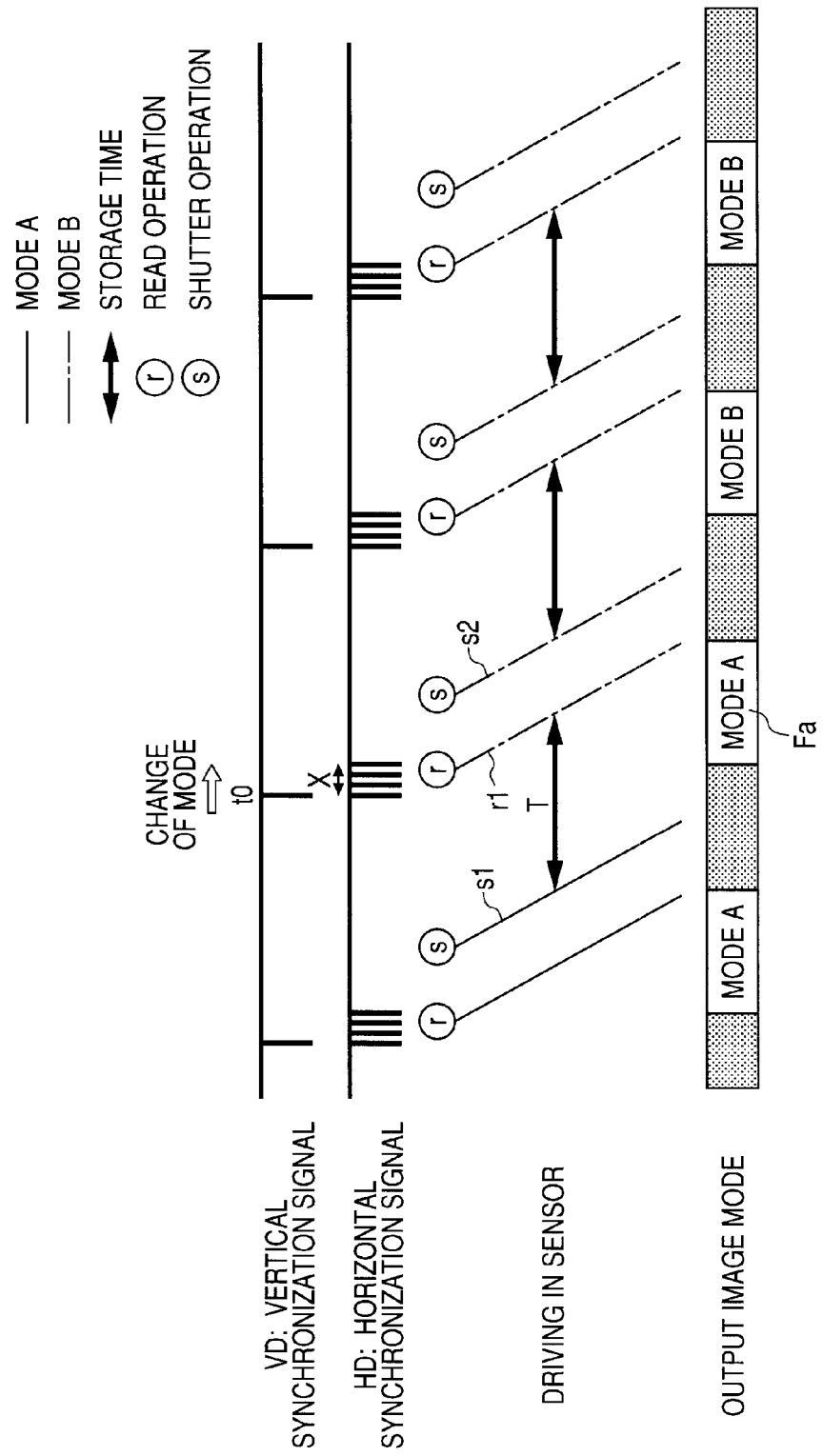
FIG. 8 is a timing chart illustrating the state of images output when the images captured by different driving modes are continuously read in the CMOS image sensor according to the embodiment of the invention.

In FIG. 8, in order to realize the operation, it is necessary to previously set a communication period for which the timing t0 for changing a mode is included in the frame Fa. That is, the following procedure needs to be predetermined: when communication for changing the driving mode is completed in a predetermined horizontal period X of a frame in which the driving mode is changed, a shutter operation s2 is performed in the changed driving mode (in this embodiment, the mode B).

As described above, when images captured by different image capturing modes, for example, images obtained by driving modes having different frame rates, such as an all-pixel read mode and a horizontal/vertical n/n read mode (that is, images obtained by different modes), are continuously read (output), the above-mentioned driving method makes it possible to keep the storage times of all rows of pixels equal to each other in a continuous series of frames. Therefore, it is possible to continuously output the images captured by different image capturing modes with the storage time set to a maximum value, without outputting invalid data.

APPLICATIONS

The CMOS image sensor 10 according to the above-described embodiment may be used as an imaging device (image input device) of an imaging apparatus, such as a digital still camera or a video camera.

The imaging apparatus means a solid-state imaging device serving as an imaging device, a camera module including an optical system for forming the optical image of a subject on an imaging surface (light receiving surface) of the solid-state imaging device and a signal processing circuit for the solid-state imaging device (for example, a camera module that is provided in an electronic apparatus, such as a cellular phone), and a camera system, such as a digital still camera or a video camera provided with the camera module.

FIG. 9 is a block diagram illustrating an example of the structure of an imaging apparatus according to another embodiment of the invention. As shown in FIG. 9, the imaging apparatus according to the embodiment of the invention includes, for example, an optical system having a lens 41, an imaging device 42, and a camera signal processing circuit 43.

The lens 41 forms the optical image of a subject on an imaging surface of the imaging device 42. The imaging device 42 converts the optical image formed on the imaging surface by the lens 41 into electric signals in the units of pixels and outputs the obtained image signals. The CMOS image sensor 10 according to the above-described embodiment is used as the imaging device 42. The camera signal processing unit 43 performs various signal processes on the image signals output from the imaging device 42.

As described above, in the imaging apparatus, such as a camera module provided in a mobile apparatus, such as a video camera, an electronic still camera, or a cellular phone, when the CMOS image sensor 10 according to the above-described embodiment is used as the imaging device 42, the following operations and effects can be obtained.

That is, in the CMOS image sensor 10 according to the above-described embodiment, it is possible to continuously output the images captured by different image capturing modes (images captured by different pixel driving modes) with the storage time set to a maximum value, without outputting invalid data. Thus, when moving pictures or still pictures are captured, it is possible to continuously display the images captured by different image capturing modes.

It should be understood by those skilled in the art that various modifications, combinations, sub-combinations and alterations may occur depending on design requirements and other factors insofar as they are within the scope of the appended claims or the equivalents thereof.

What is claimed is:
1. A solid-state imaging device comprising:
a pixel array section having a plurality of unit pixels, each including a photoelectric conversion element, arranged therein;
a driving unit which performs:
 (1) a shutter operation in which a charge stored in the photoelectric conversion element is removed,
 (2) a read operation in which the charge from the photoelectric conversion element is read, and
 (3) a storage operation in which the charge in the photoelectric conversion element is stored, a control unit which changes a unit pixel driving mode from a first driving mode to a second driving mode and which changes a shutter operation to the second driving mode while keeping the read operation in the first driving mode for a period corresponding to one frame in a current frame, and which changes the read operation to the second driving mode in a next frame, wherein, the control unit sets a period required for scanning each row of pixels in the first driving mode equal to a period required for scanning each row of pixels in the second driving mode.

2. The solid-state imaging device according to claim 1, wherein the control means unit includes a delay circuit that delays the timing of when a discriminating signal for the read operation is applied by the period corresponding to one frame when the driving mode is changed on the basis of only the discriminating signal for the shutter operation and on the basis of only the discriminating signal for the read operation corresponding to the unit pixel driving mode.

3. The solid-state imaging device according to claim 1, wherein the control unit includes a frequency dividing circuit that divides a horizontal synchronization signal, which is a horizontal scanning standard for each of the unit pixels, at a frequency division ratio corresponding to the unit pixel driving mode.

4. The solid-state imaging device according to claim 3, wherein the horizontal synchronization signal is a signal having a period corresponding to one of the unit pixel driving modes having a lowest frame rate.

5. A method of driving a solid-state imaging device including a plurality of unit pixels, each having a photoelectric conversion element, which performs a shutter operation to remove a charge stored in the photoelectric conversion element and a read operation which reads the charge of an electric signal that is obtained by the photoelectric conversion element and is stored in the photoelectric conversion element, the method comprising the steps of:

changing a unit pixel driving mode from a first driving mode to a second driving mode;

changing the shutter operation to the second driving mode;

keeping the read operation in the first driving mode for a period corresponding to one frame in a current frame, and changing the read operation to the second driving mode in the next frame; and setting a period required for scanning each row of pixels in the first driving mode equal to a period required for scanning each row of pixels in the second driving mode.

6. An imaging apparatus comprising:

a solid-state imaging device including a plurality of unit pixels, each having a photoelectric conversion element, and performing a shutter operation for removing charge stored in the photoelectric conversion element and a read operation for reading the charge of an electric signal that is obtained by the photoelectric conversion of the photoelectric conversion element and is stored in the photoelectric conversion element;

an optical system guiding light from a subject onto an imaging surface of the solid-state imaging device; and a control unit which changes a pixel driving mode from a first driving mode to a second driving mode, for changing the shutter operation to the second driving mode while keeping the read operation in the first driving mode for a period corresponding to one frame in the current frame, and changes the read operation to the second driving mode in the next frame, wherein, the control unit sets a period required for scanning each row of pixels in the first driving mode equal to a period required for scanning each row of pixels in the second driving mode.

7. A solid-state imaging device comprising:

a pixel array section having a plurality of unit pixels, each including a photoelectric conversion element, arranged therein;

a driving unit configured to perform a shutter operation in which a charge stored in the photoelectric conversion element is removed and a read operation in which the charge of an electric signal that is obtained by the photoelectric conversion of the photoelectric conversion element and is then stored in the photoelectric conversion element is read; and a control unit configured to, change the shutter operation to the second driving mode while keeping the read operation in the first driving mode for a period corresponding to one frame in the current frame, and change the read operation to the second driving mode in the next frame, wherein, the control unit sets a period required for scanning each row of pixels in the first driving mode equal to a period required for scanning each row of pixels in the second driving mode.

* * * * *